US012450255B2

(12) United States Patent
Lee et al.

(10) Patent No.: US 12,450,255 B2
(45) Date of Patent: Oct. 21, 2025

(54) AUTOMATIC, ONLINE AND SPACE EFFICIENT CLUSTERING AND COMPRESSION OF VERY LARGE DATABASE OBJECTS

(71) Applicant: Oracle International Corporation, Redwood Shores, CA (US)

(72) Inventors: Teck Hua Lee, Newark, CA (US); Hariharan Lakshmanan, Brisbane, CA (US); Sujatha Muthulingam, San Ramon, CA (US); Andrew Witkowski, Foster City, CA (US); Shasank Kisan Chavan, Menlo Park, CA (US); You Jung Kim, Palo Alto, CA (US); Sooyeon Jo, Redwood City, CA (US); Yu Chieh Fu, Redmond, WA (US); Vicente Hernandez Jimenez, Jalisco (MX); Tirthankar Lahiri, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 78 days.

(21) Appl. No.: 18/373,082

(22) Filed: Sep. 26, 2023

(65) Prior Publication Data

US 2024/0111790 A1     Apr. 4, 2024

Related U.S. Application Data

(60) Provisional application No. 63/411,795, filed on Sep. 30, 2022.

(51) Int. Cl.
*G06F 16/27*     (2019.01)
*G06F 16/22*     (2019.01)
(Continued)

(52) U.S. Cl.
CPC ........... *G06F 16/27* (2019.01); *G06F 16/221* (2019.01); *G06F 16/2365* (2019.01);
(Continued)

(58) Field of Classification Search
CPC .... G06F 16/27; G06F 16/221; G06F 16/2379; G06F 16/24569; G06F 16/285;
(Continued)

(56) References Cited

U.S. PATENT DOCUMENTS 11,151,081 B1 * 10/2021 Anand .................... G06F 16/13
11,455,114 B1 *  9/2022 Chinthekindi ........ G06F 3/0647
(Continued)

*Primary Examiner* — Jensen Hu
(74) *Attorney, Agent, or Firm* — Hickman Becker Bingham Ledesma LLP

(57) ABSTRACT

Techniques are provided for optimizing storage of database records in segments using sub-segments. A base segment is a container used for storing records that belong to a database object. A database management system receives a request to load, into the database object, a first set of records that are in a first state. In response to receiving the request, the system generates a new sub-segment, which is a container that is separate from the base segment. The system stores the first set of records, in their first state, within the sub-segment. The system then monitors one or more characteristics of the database system. In response to the one or more characteristics satisfying criteria, the system performs a migration of one or more records of the first set of records from the sub-segment to the base segment. During the migration, the system converts the one or more records from the first state to a second state and stores the one or more records, in their second state, in the base segment.

20 Claims, 6 Drawing Sheets

(51) Int. Cl.
*G06F 16/23* (2019.01)
*G06F 16/245* (2019.01)
*G06F 16/2453* (2019.01)
*G06F 16/2455* (2019.01)
*G06F 16/25* (2019.01)
*G06F 16/28* (2019.01)

(52) U.S. Cl.
CPC ...... *G06F 16/2379* (2019.01); *G06F 16/2453* (2019.01); *G06F 16/24552* (2019.01); *G06F 16/24561* (2019.01); *G06F 16/24569* (2019.01); *G06F 16/258* (2019.01); *G06F 16/285* (2019.01)

(58) Field of Classification Search
CPC ......... G06F 16/24552; G06F 16/24561; G06F 16/258; G06F 16/2365; G06F 16/2453; G06F 16/2219; G06F 12/03
See application file for complete search history.

(56) References Cited

U.S. PATENT DOCUMENTS

| | | | | |
|---|---|---|---|---|
| 2010/0278446 A1* | 11/2010 | Ganesh | ................. | G06F 16/221 382/243 |
| 2011/0029569 A1* | 2/2011 | Ganesh | ................. | G06F 16/284 707/E17.005 |
| 2012/0296883 A1* | 11/2012 | Ganesh | ................. | G06F 16/185 707/693 |
| 2014/0095449 A1* | 4/2014 | Marwah | ................. | G06F 16/217 707/668 |
| 2021/0365326 A1* | 11/2021 | Noto | ................... | G06F 11/1458 |

* cited by examiner

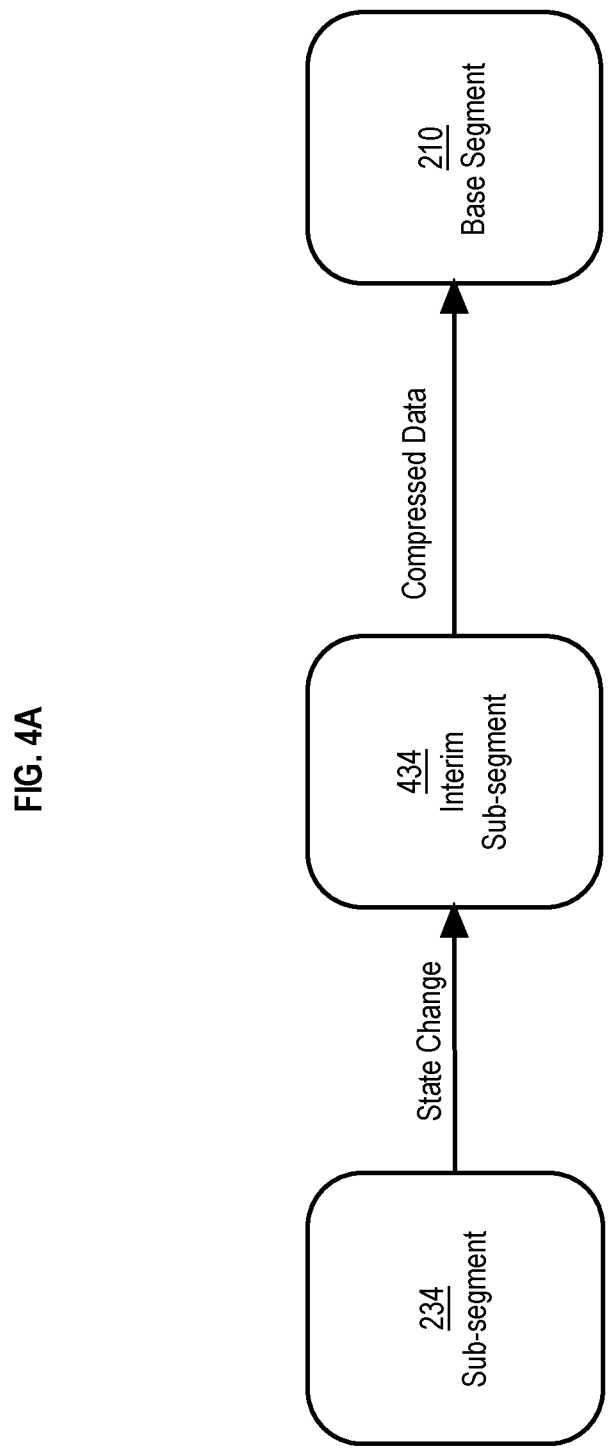

AUTOMATIC, ONLINE AND SPACE EFFICIENT CLUSTERING AND COMPRESSION OF VERY LARGE DATABASE OBJECTS

CROSS-REFERENCE TO RELATED APPLICATIONS; BENEFIT CLAIM

This application claims the benefit of Provisional Application 63/411,795, filed Sep. 30, 2022, the entire contents of which is hereby incorporated by reference as if fully set forth herein, under 35 U.S.C. § 119(e).

FIELD OF THE INVENTION

The present invention relates to database systems, and more specifically to automatic clustering and compression of very large database objects.

BACKGROUND

In database systems, a data block corresponds to a specific number of bytes of physical space on disk. The size of a data block represents the smallest unit of storage that a database may allocate for storing a database object. On disk, each data block belongs to an extent. An extent is defined as a specific number of contiguous data blocks allocated for storing a specific type of information. A segment contains a set of extents that has been allocated for a specific type of data structure. For example, data in a database table may be stored in a segment (where the segment is a set of extents, and where each extent is made up of a set of contiguous data blocks).

As records are stored in a segment, the size of the segment grows (e.g. new extents may be added to the segment to accommodate more records). When storing large volumes of data, systems may implement space saving techniques to compress data when storing the data on disk. For example, systems may compress and cluster data when loading data into segments on disk. Compression may significantly reduce the on-disk footprint of data stored within segments, thereby reducing the amount of disk space needed to store data. However, conventional approaches to compressing data on disk may involve CPU and memory intensive operations to compress the data prior to storing the data within one or more segments on disk.

Another drawback to conventional methods of compressing data is that a single type of compression technique is used for data when loaded and stored within any given segment. For example, a load operation may specify a compression technique for loading and storing data into a segment. The data loaded, during the load operation, into a segment may contain infrequently-accessed records that are compressed using the same high-compression technique, in order to save storage space. Using the same compression technique on all data loaded during the load operation into the segment may work well when all the records in the segment are accessed at relatively the same frequency. However, if a segment contains a first subset of records that are accessed infrequently and a second subset of records that are accessed frequently, then using a single load with a single compression technique for all of the data loaded into the segment will result in either inefficient storage of the first subset of records or inefficient performance for the second subset of records.

Database clustering is a technique for optimizing data storage and retrieval by storing related data physically together on disk (e.g. in the same extents). The related data may include values from a set of columns of a database table that are frequently joined in database queries. By storing the set of columns within a common set of extents, query performance may be improved by reducing the number of I/O operations required to execute the query. However, clustering related data involves organizing the data prior to writing to one or more extents. For instance, values from database columns are sorted prior to writing the values to disk. The sorting steps may involve CPU and memory intensive operations which may significantly slow down writing the data to one or more extents. Therefore, a mechanism for optimizing storage and optimizing performance for records in a segment is desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 4A depicts an example of a workload flow for storing a set of records in a segment using a sub-segment, according to an embodiment.

DETAILED DESCRIPTION

Figure 1:
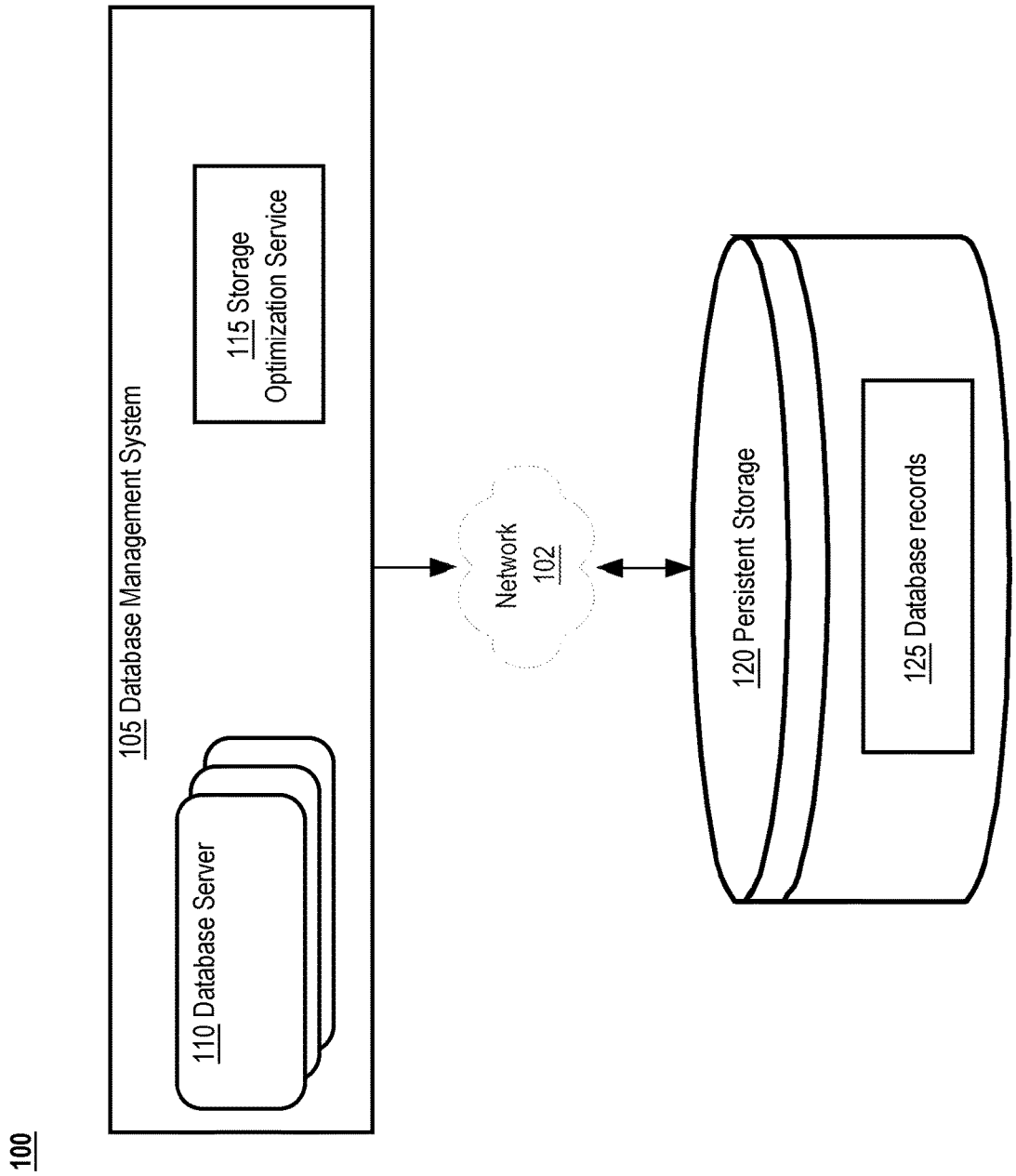
FIG. 1 is a system diagram that illustrates a database management system implemented to store records in persistent storage, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for optimizing storage of database data records in segments using sub-segments. A segment is a container that contains a set of extents. Conventional database systems use a single segment to store data from an unpartitioned table or from a single partition of a partitioned table. For the purposes of clarity, segments shall be referred to herein as "base segments". A Sub-segment is a virtual segment that is a container that contains one or more extents and is associated with a base segment. Multiple sub-segments may be associated with a single base segment.

Sub-segments may be dynamically created and dropped depending on system demands.

In an implementation, each base segment not only contains a plurality of extents, but also contains references to one or more sub-segments associated with the base segment. Sub-segments are associated with their corresponding base segment by way of an address pointer. For instance, a particular base segment may contain a reference to metadata containing references to one or more sub-segments. Sub-segments allow for dynamic partitioning of records without an explicit partitioning column. For instance, subsets of records may be grouped together based on their corresponding access frequencies, where each group of records thus created is stored within a corresponding sub-segment (e.g. a "frequently-accessed" group is stored in a first sub-segment, and a "infrequently-accessed" group is stored in a second sub-segment). The database server may use a different optimization/compression technique for each of the different sub-segments.

In an implementation, the database management system is implemented to maintain a base segment that is a container for storing records that belong to a database object. The database management system may receive a request to load into the database object a first set of records that are in a first state. The first state may represent the first format condition of the records. For instance, the first set of records may be in an uncompressed and unclustered format. In another example, the format of the first set or records may be represented in either a row-major format or a column-major format.

In an implementation, in response to receiving the request, the database management system may generate a new sub-segment, where the new sub-segment is a container that is separate from the base segment. The database management system may then store the first set of records, in their first state, within the sub-segment. After storing the first set of records in the sub-segment, the database management system monitors one or more characteristics of records that belong to the first set of records. Additionally, the database management system monitors characteristics of base segments and sub-segments. Examples of characteristics monitored may include, but are not limited to, access frequencies of the first set of records stored in the sub-segment, the overall size of the sub-segment, types of database operations performed on the first set of records including the number of queries and the number of updates on the first set of records, and any other database operations performed on data within the sub-segment.

In an implementation, in response to the monitoring, the database management system determines that the one or more characteristics of records belonging to the first set of records satisfy particular criteria. In response to determining that one or more characteristics of records satisfy the particular criteria, the database management system performs a migration of a particular set of one or more records, from the first set of records, from the sub-segment to the base segment. During the migration of the particular set of one or more records from the sub-segment to the base segment, the database management system converts each record, of the particular set of records, from the first state to a second state. Examples of converting the records from the first state to the second state include: converting from an uncompressed format to a compressed format, converting from an unclustered format to a clustered format, converting from a row major format to a column major format, and converting from a column major format to a row major format. Upon converting the records into the second state, the database management system stores the records, which are in the second state, into the base segment.

In an implementation, once the records have been stored in the base segment, the database management system may continue to monitor database characteristics of the records, including the characteristics of the base segment. If, for example, the database management system determines that at least a subset of records are being accessed at a high rate, then the database management system may migrate the subset of records from the base segment to another sub-segment. During the migration, the database management system may change the state of the subset of records to improve processing efficiency. For example, if the subset of records stored in the base segment were compressed, then the database management system may decompress the subset of records in order to improve query processing.

Records stored in different sub-segments may be compressed using different compression techniques, such that the records in each sub-segment may be optimized for both storage and performance because compression and/or clustering of records for a sub-segment is independent of other sets of records in other sub-segments. Thus, the use of sub-segments provide a finer level of granularity for compressing and clustering records in segments by using different compression and clustering techniques for records in different sub-segments within each segment. By utilizing sub-segments to organize records, database systems are able to increase compression optimization of data storage.

Structural Overview

FIG. 1 is a system diagram that illustrates a database management system implemented to store records in persistent storage, according to an embodiment. System 100 includes database management system (DBMS) 105, network 102, and persistent storage 120. DBMS 105 is implemented to manage one or more databases. DBMS 105 comprises one or more database servers 110 and a storage optimization service 115. Database server 110 may host one or more databases. A database may comprise database data and a data dictionary that are stored on a persistent memory mechanism, such as persistent storage 120 or any other hard disks. Database data may be stored in one or more collections of records. The data within each record is organized into one or more attributes. In relational DBMSs, the collections are referred to as tables (or data frames), the records are referred to as records, and the attributes are referred to as attributes. Users interact with database server 110 by submitting commands to database server 110 to perform operations on data stored in the database. Additional details for DBMS 105 and database server 110 are described in the DBMS OVERVIEW section herein, although an embodiment of the present invention is not so limited. Network 102 may be any type of network that provides communications, exchanges information, and/or facilitates the exchange of data between components of the DBMS 105 and persistent storage 120. For instance, network 102 may represent one or more local area networks (LANs), wide area networks (WANs), metropolitan area networks (WANs), or any other network implemented to facilitate data exchange between the components of system 100.

Storage Optimization Service

In an implementation, the storage optimization service 115 is implemented to monitor data blocks containing records located in sub-segments and base segments to determine whether to migrate the records between sub-segments and base segments based on various criteria. During a migration of records, the storage optimization service 115 may format the records to optimize storage space, optimize query processing, and/or both. Formatting of records may include compressing records, clustering records, changing the format of records from row major to column major and vice versa, and any other data conversion techniques. For example, during a migration of records from a sub-segment to a base segment, the storage optimization service 115 may compress the records to minimize storage space consumed in persistent storage 120. Alternatively, if the records are already compressed, the storage optimization service 115 may determine that query processing may be further optimized if the records are stored in an uncompressed form. The storage optimization service 115 may then convert the records into an uncompressed format and store the uncompressed records in a new sub-segment or the base segment.

In an implementation, the storage optimization service 115 determines when to migrate records between sub-segments and base segments by monitoring one or more database characteristics of records stored in base segments and sub-segments as well as the base segments and sub-segments themselves. The one or more database characteristics monitored by the storage optimization system 115 include, but are not limited to, access frequency of records, size of individual sub-segments, amount of space used in persistent storage 120, and the different types of database operations executed. For instance, the storage optimization service 115 may monitor the rate of DML commands received versus the rate of database queries received. If most database operations are read-only operations, then the storage optimization service 115 may determine that it is a good time to compress records as the values in the records are not being updated at a high rate.

In an implementation, the storage optimization service 115 may use a heatmap to track row-level statistics to determine when certain records stored in a sub-segment or base segment become "hot" or "cold". The term "heatmap" in this application refers to statistics reflecting activity regarding various elements in a database: elements with recent accesses are "hot" whereas elements without recent accesses are "cold". Upon identifying records that are cold, the storage optimization service 115 may implement one or more compression techniques to compress records prior to migrating the records to a base segment or a different sub-segment.

In an implementation, the storage optimization service 115 may trigger migration, and compression and/or clustering, of one or more records between sub-segments and base segments based on defined migration policies. A migration policy may define thresholds for various database characteristics to determine when and how to migrate and convert records from one base segment/sub-segment to another. In one example, the storage optimization service 115 may define, within a policy, one or more heatmap-based thresholds for identifying "hot" records and "cold" records. The storage optimization service 115 may use a "cold threshold" to identify a subset of records in a sub-segment that are accessed at a frequency that is below the defined cold threshold. The subset of records that are below the cold threshold may be compressed and moved to a base segment or another sub-segment. Additionally, the storage optimization service 115 may use a "hot threshold" to identify a subset of records in the sub-segment that are accessed at a frequency that is above the defined hot threshold. This hot subset of records may stay in the sub-segment until the hot subset of records becomes "cold" or the hot subset of records may be moved to another sub-segment that contains only hot records.

In an implementation, the storage optimization service 115 is implemented to generate new sub-segments when needed and delete sub-segments when a sub-segment is empty. For example, when a new request to insert records into persistent storage 120 is received, the storage optimization service 115 may generate a new sub-segment to store the new records. Additionally, if a subset of records is identified as "very hot" and needs to be migrated to a new sub-segment for "very hot" records, the storage optimization service 115 may generate the new sub-segment for the migration. After migrating records out of an existing sub-segment, the storage optimization service 115 may determine that the existing sub-segment does not contain any records and may delete the existing sub-segment to reclaim storage space in persistent storage 120.

Prior to optimizing any records stored in a sub-segment, the storage optimization service 115 changes the state of the sub-segment from a "staging" state to an "interim" state. The staging state for a sub-segment is a state in which the sub-segment may accept requests to load records in the sub-segment. Each sub-segment may be associated with a transaction ID such that each sub-segment only receives records that are associated with the same transaction ID. The interim state is a state in which the sub-segment determines whether records should be optimized for storage in a base segment and/or whether records should be moved to another sub-segment. When a sub-segment is in the interim stage, the sub-segment may not receive any additional records.

In an implementation, the storage optimization service 115 may monitor size of sub-segments in persistent storage 120 to determine whether a sub-segment becomes too large. When sub-segments become a certain size, the cost of optimizing and reorganizing its contents becomes expensive. For this reason, the storage optimization service 115 may implement one or more sized-based thresholds for monitoring sizes of sub-segments. When a sub-segment reaches a certain size, the storage optimization service 115 may change the state of the sub-segment such that the sub-segment does not receive any additional records. The storage optimization service 115 may then migrate subsets of records to a base segment if access frequencies for the subsets of records are below certain predefined thresholds.

In an implementation, storage optimization service 115 may keep the subset of records in a sub-segment without eventually moving the subset of records to the base segment. For example, if the subset of records represents hot records that are updated frequently, then the storage optimization service 115 may keep the subset of records in a specific sub-segment configured for extremely hot data. The specific sub-segment may store the hot records in uncompressed form for optimal query performance.

Converting Records to a Different Format

In an implementation, the storage optimization service 115 is implemented to convert records from one state to another state when migrating records from one segment to another segment. For instance, the storage optimization service 115 may change the format of records to improve overall storage efficiency and/or query processing efficiency, such as changing records from a row major format to a column major format or vice versa. Additionally, the storage optimization service 115 may perform different types of compression on records based on observed database characteristics. For example, the storage optimization service 115 may implement a multi-threshold policy for categorizing records. The multi-threshold policy may define multiple heatmap based thresholds to categorize records such that certain subsets of records may be compressed using different compression techniques. For example, a first subset of records identified that are accessed at the lowest frequency may be compressed using Hybrid Columnar Compression (HCC) techniques such as HCC Archive compression, which provides a high level of compression. A second subset of records that may be identified as being accessed at a second lowest frequency may be compressed using HCC Query compression, which provides high compression but faster access than HCC Archive. A third subset of records that may be identified as being accessed at a relatively frequent rate and may be compressed using Online Transaction Processing (OLTP) compression techniques. A fourth subset of records that may be identified as being accessed at a very high rate and as a result may be left in an uncompressed state. The storage optimization service 115 may implement any number of access frequency thresholds and implement any number of compression techniques to compress records prior to migrating the records to a base segment.

Clustering Records

In an implementation, the storage optimization service 115 is implemented to cluster records based on various conditions and characteristics of database system 100. In one example, DBMS 105 may receive a request to insert records into a new table and store the table in persistent storage 120 with attribute clustering on one or more identified columns. For instance, a CREATE TABLE command may include an attribute clustering clause such as:

```
CREATE TABLE SALES (
    prod_id       NUMBER(6)    NOT NULL,
    cust_id       NUMBER       NOT NULL,
    time_id       DATE         NOT NULL,
    promo_id      NUMBER(6)    NOT NULL,
    quantity_sold NUMBER(3)    NOT NULL
)
CLUSTERING
    BY LINEAR ORDER (cust_id, prod_id);
``` where the "SALES" table is clustered based on the "cust_id" and "prod_id" columns. Upon receiving the create table command and a command to insert records into the SALES table, the storage optimization service 115 initially stores the records in a new sub-segment in an unclustered format. The storage optimization service 115 may then monitor access frequencies of records in the SALES table to determine when to convert the records into a clustered format.

Converting records from an unclustered format to a clustered format based on one or more columns is accomplished by first sorting the records based on the one or more columns. Using the current example, records for the sales table are first sorted based on the cust_id and prod_id columns. Sorting records according to the columns involves an amount of processing workload. If the records in the sales table are being updated at a high rate, then the storage optimization service 115 would need to repeat the sorting step to account for changes in values. For this reason, the storage optimization service 115 may delay sorting and clustering of records until the records are sufficiently cold enough to be clustered without having to repeat tasks, such as sorting. In an implementation, the storage optimization service 115 may monitor access frequencies of records in the sales table to determine when access activity of the records is below the defined threshold. Once the access activity of the records is below the defined threshold, the storage optimization service 115 may initiate converting the records in the sales table into a clustered format, which includes sorting the records based on the cust_id and prod_id columns.

In an implementation, the storage optimization service 115 may be implemented to monitor and determine clustering opportunities for tables based on previously received query requests. For example, the DBMS 105 may receive several query requests on the SALES table in which the queries contain predicates on prod_id and promo_id. The storage optimization service 115 may determine, based on historical query data, that the SALES table should be clustered based on the prod_id and promo_id. As a result, the storage optimization service 115 may monitor access frequencies for the SALES table and determine when to automatically cluster records in the SALES table based on the prod_id and promo_id columns. In yet other embodiments, the storage optimization service 115 may monitor current and historical database characteristics to determine whether to cluster tables based on historical queries.

Database Records

Referring to FIG. 1, persistent storage 120 generally represents any number of persistent storage devices, such as magnetic disks, FLASH memory, and/or solid-state drives. FIG. 1 depicts persistent storage 120 as being external from database server 110, however, in other embodiments persistent storage 120 may refer to local storage located on database server 110. Persistent storage 120 contains database records 125. Database records 125 represent records stored in persistent storage 120 from database instances running on database server 110. Database records 125 may be stored within a plurality of base segments and sub-segments.

Figure 2:
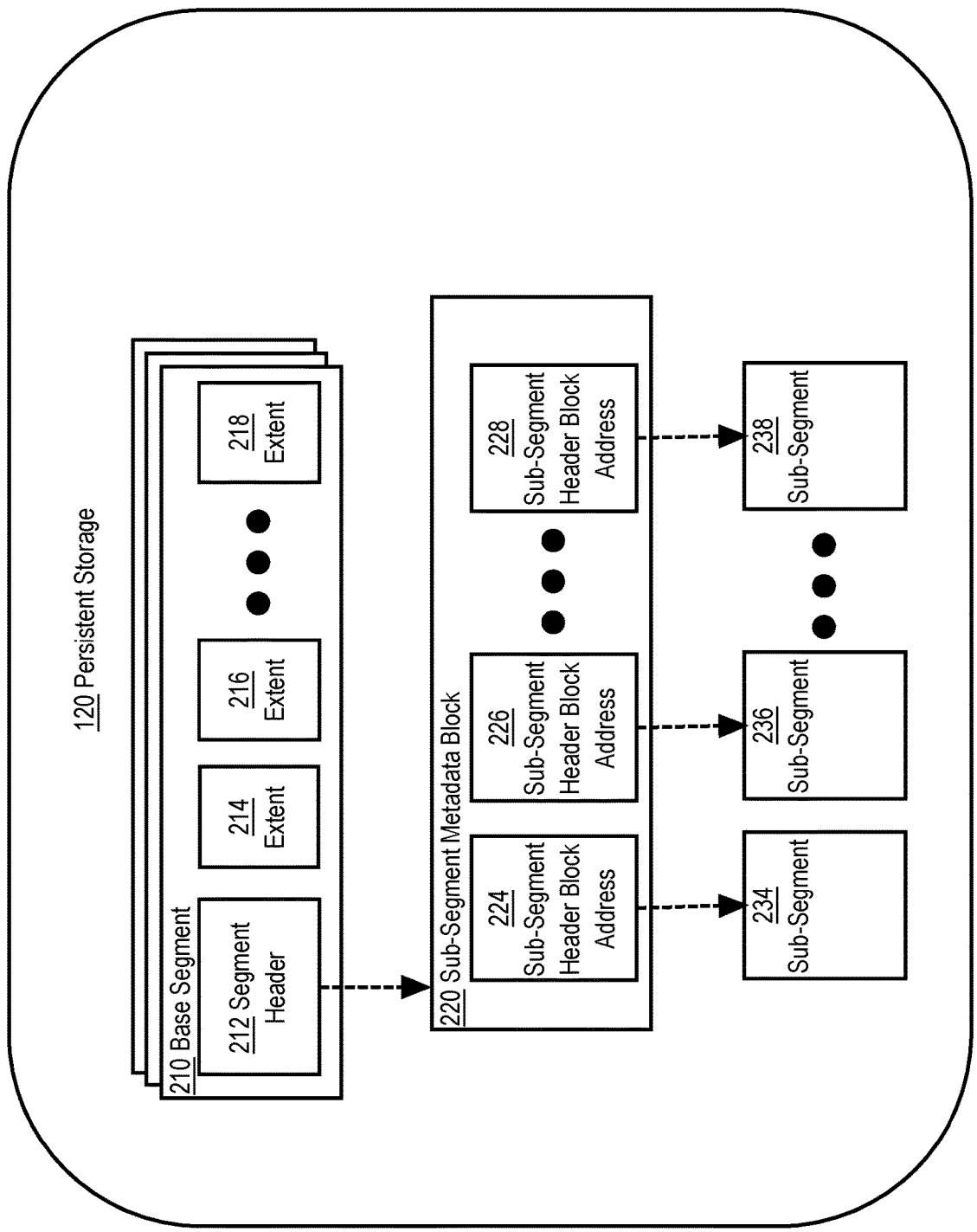
FIG. 2 is a block diagram of persistent storage, illustrating relationships between base segments and sub-segments, according to an embodiment.

FIG. 2 is a block diagram of persistent storage 120, illustrating relationships between base segments and sub-segments, according to an embodiment. Base segment 210 represents one or more segments in persistent storage 120 designated to store database records 125. Base segment 210 contains segment header 212 and extents 214, 216, and 218. Base segment 210 may contain more or less extents than illustrated in FIG. 2. Segment header 212 is a header block that contains control information for free data blocks, extents, high water marks, and a reference to a sub-segment metadata block 220. Extents 214, 216, and 218 each represent contiguous sets of data blocks. A high water mark defines the data footprint of a segment. The location referenced by the high water mark refers to a boundary between used and unused space within a segment. Data blocks below the high water mark are data blocks that have been used at least once, while data blocks above the high water mark are data blocks that have yet to be used and do not contain data. The high water mark may be used during a table scan operation to identify which data blocks contain data that should be scanned and which data blocks do not contain data and should not be scanned.

In an implementation, the sub-segment metadata block 220 is an object implemented to store an array of sub-segment header block addresses. Referring to FIG. 2, the sub-segment metadata block 220 contains sub-segment header block addresses 224, 226, and 228. Each of the sub-segment header block addresses 224, 226, and 228 refer to sub-segments 234, 236, and 238. The DBMS 105 uses an extent map to keep track of all extents that store data, including extents within sub-segments and base segments. The extent map is used to determine which extents need to be scanned when executing database operations. Due to the association between base segment 210, sub-segment metadata block 220, and sub-segments 234, 236, and 238, extents within sub-segments 234, 236, and 238 look like they belong to base segment 210. When sub-segments are dynamically created and/or deleted the extent map is updated to reflect any changes made to extents within sub-segments.

In an implementation, when a query request is received by the DBMS 105, the DBMS 105 uses the extent map to determine the location of extents that contain records for the tables queried. If records are stored in extents that are located in multiple sub-segments, then the extent map will contain the address locations of those extents located in the multiple sub-segments. The DBMS 105 may use the extent map to identify locations of target records from the extents that make up the multiple sub-segments. The DBMS 105 may retrieve the target records and combine the target records to make up a result set that satisfies the received query request.

Sub-segments are implemented to accept various types of record inserts, including direct path loads. A direct path load is a technique for efficiently loading data into database files without using conventional SQL insert statements. The direct path load formats data blocks and directly writes the data blocks to database files. The direct path load uses the base segment's high water mark to locate the unused data blocks, above the high water mark, and efficiently load the records into the unused data blocks. However, base segments can only allow one direct path load at a time due to the fact there is only one high water mark per segment. Additionally, when executing a direct path load operation on a base segment, the base segment may be locked from certain queries and data manipulation language (DML) operations.

In an implementation, each sub-segment has its own high water mark and as a result, each sub-segment may accept its own direct path load, thereby allowing concurrent direct path loads to occur on multiple sub-segments that are associated with a single base segment. For example referring to FIG. 2, base segment 210 may allow multiple concurrent direct path loads where a first direct path load occurs on sub-segment 234, a second direct path load occurs on sub-segment 236, and a third direct path load occurs on sub-segment 238. While the direct path loads on sub-segments 234, 236, and 238 are in progress, base segment 210 may be able to accept a DML operation.

Process Overview

Figure 3:
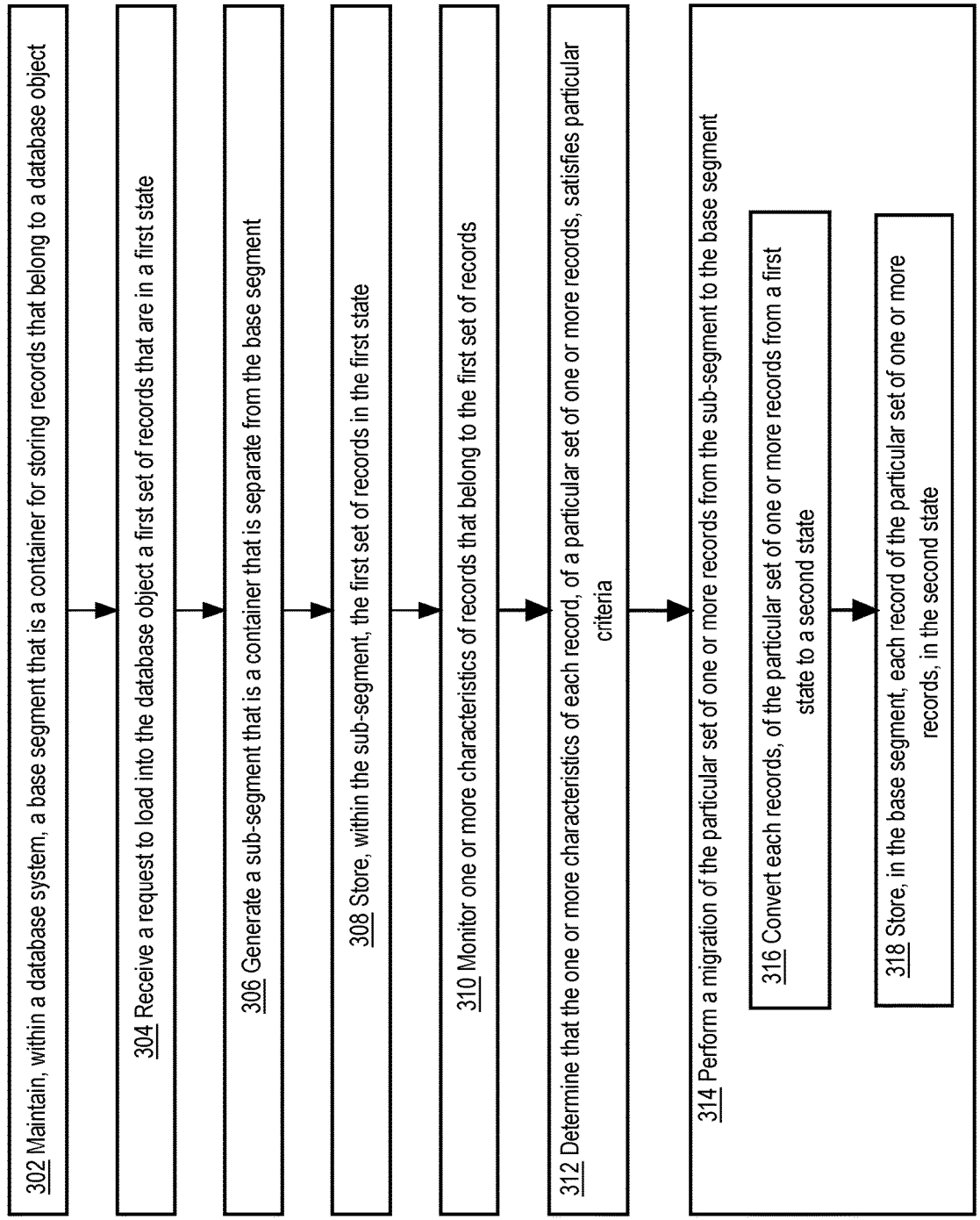
FIG. 3 is a flow diagram that depicts a process for receiving a request to insert records into persistent storage, modifying the state of the records to optimize storage and/or query performance, and storing the records in persistent storage, according to an embodiment.

Records to be stored in persistent storage 120 may be optimized for space reduction and increased query performance by the storage optimization service 115. FIG. 3 is a flow diagram that depicts a process 300 for receiving a request to insert records into persistent storage, modifying the state of the records to optimize storage and/or query performance, and storing the records in persistent storage, according to an embodiment. The steps of the process as shown in FIG. 3 may be implemented using processor-executable instructions that are stored in computer memory. For the purposes of providing a clear example, the steps of FIG. 3 are described as being performed by processes executing in DBMS 105. For the purposes of clarity, the process described may be performed with more or fewer steps than described in FIG. 3.

At step 302, process 300 maintains, within a database system, a base segment that is a container for storing records that belong to a database object. In an implementation, DBMS 105 maintains a base segment located in persistent storage 120, where the base segment is a container that contains one or more extents implemented to store a database object, such as a database table. For example, referring to FIG. 2, DBMS 105 maintains base segment 210 in persistent storage 120. Base segment 210 is made up of extents 214, 216, and 218.

At step 304, process 300 receives a request to load into the database object a first set of records that are in a first state. In an implementation, DBMS 105 receives a request to load a first set of records into a database object, such as a database table. For example, the request may be a request to insert records into a SALES table. The first set of records are in a first state. Examples of the first state for the first set of records may include being uncompressed records, unclustered records, uncompressed and unclustered records, compressed records, records formatted in row major format, records formatted in column major format, or any other format.

At step 306, process 300 generates a sub-segment that is a container that is separate from the base segment. In an implementation, the storage optimization service 115, in response to receiving the request to load the first set of records into the database object, generates a new sub-segment to temporarily store the first set of records. For example, the storage optimization service 115 generates sub-segment 234 for storing the first set of records. Upon generating sub-segment 234, the storage optimization service 115 associates sub-segment 234 with base segment 210 by inserting, into sub-segment metadata block 220, a reference to the header block address for sub-segment 234 (sub-segment header block address 224), where segment header 212 contains a reference to the sub-segment metadata block 220.

At step 308, process 300 stores, within the sub-segment, the first set of records in the first state. In an implementation, the storage optimization service 115 stores the first set of records in one or more extents located in the newly generated sub-segment. FIG. 4A depicts an example of a workload flow for storing a set of records in a segment using a sub-segment, according to an embodiment. Sub-segment 234 represents the target sub-segment where the storage optimization service 115 inserts the first set of records. For example, sub-segment 234 contains a plurality of extents that each contain a plurality of data blocks. The storage optimization service 115 inserts the first set of records for the SALES table, in uncompressed form, into a plurality of data blocks that are part of extents that belong to sub-segment 234. In an implementation, when sub-segment 234 is accepting inserts of records, sub-segment 234 is in the "staging" state.

In an implementation, DBMS 105, upon storing the first set of records in sub-segment 234, may update the extent map to include the location of the first set of records as being stored within extents located in sub-segment 234. Upon updating the extent map, DBMS 105 may receive subsequent query requests for records stored within sub-segment 234. DBMS 105, upon receiving the request, may refer to the extent map to determine where to scan for records matching the query request.

At step 310, process 300 monitors one or more characteristics of records that belong to the first set of records. In an implementation, the storage optimization service 115, after storing the first set of records in sub-segment 234, monitors characteristics of records in the first set of records to determine when to migrate the first set of records to base segment 210 and whether to change the state of the first set of records. Additionally, the storage optimization service monitors characteristics of the database system 100, including monitoring the size of sub-segments and base segments. Example characteristics monitored include, but are not limited to, access frequency of records, the different types of database operations executed on records, size of individual sub-segments, and amount of space used in persistent storage 120.

In an example, the storage optimization service 115 uses a heatmap to track row-level statistics of records stored in sub-segment 234 to determine whether the access frequency of records is less than a threshold. A threshold may represent an access frequency level that delineates between "warm" records and "cold" records. Records that are identified as being "cold" may be eventually compressed using higher compression techniques such as HCC Archive compression. In an implementation, the storage optimization service 115 may implement several different access frequency thresholds to determine whether subsets of records should be compressed using appropriate compression levels based on the thresholds implemented.

In another example, the storage optimization service 120 may monitor the different types of database operations performed in order to determine whether the first set of records are actively being updated or are simply being queried. For example, if the first set of records, stored in sub-segment 234, are actively being updated, then it would not be efficient to compress and/or cluster the first set of records as compression and clustering algorithms may need to be rerun after a certain number of updates. Therefore, the storage optimization service 115 may initiate a state change and migration after the rate of update requests has dropped below a defined threshold.

In another example, the storage optimization service 115 may monitor the overall size of the sub-segment 234 to determine whether to migrate records stored in sub-segment 234 to another sub-segment or to base segment 210. As discussed, when sub-segments reach a certain size query performance may degrade. For this reason, the storage optimization service 115 may implement a sized-based threshold for monitoring sizes of sub-segments. When sub-segment 234 exceeds the sized-based threshold, the storage optimization service 115 may migrate at least a subset of the first set of records to another sub-segment.

In yet another example, the storage optimization service 115 may monitor the overall space usage of persistent storage 120. If the amount of used space in persistent storage 120 exceeds a defined threshold, then storage optimization service 120 may migrate and compress records stored in persistent storage 120 in order to conserve storage space.

Referring to FIG. 3, at step 312, process 300 determines that one or more characteristics of each record, of a particular set of one or more records from the first set of records, satisfies particular criteria. Examples of the one or more characteristics satisfying the particular criteria may include access frequency of the first set of records falling below a defined threshold, the size of sub-segment 234 exceeding a defined sub-segment size threshold, the overall usage of persistent storage 120 exceeding a defined usage threshold, and specific types of database operations, such as change operations, falling below a defined threshold for that type of database operation. For example, the storage optimization service 115 may determine that access frequency for the particular set of records, which are a subset of the first set of records, stored in sub-segment 234, is below the first threshold.

At step 314, in response to determining that the one or more characteristics of each record, of the particular set of one or more records from the first set of records, satisfies particular criteria, process 300 performs a migration of the particular set of one or more records from the sub-segment to the base segment. In an implementation, the storage optimization service 115, performs the migration of the particular set of one or more records from the sub-segment to the base segment. For example, in response to the access frequency crossing the first threshold, the storage optimization service 115 may initiate migration of the particular set of one or more records from sub-segment 234 to base segment 210.

Referring to FIG. 3, steps 316 and 318 represent sub-steps that are performed during the migration step described in step 314. At step 316 process 300 converts each record, of the particular set of one or more records, from the first state to a second state. In an implementation, the storage optimization service 115 performs a conversion from the first state to a second state for each of the records in the particular set of one or more records. As previously described, the conversion from the first state to a second state may include converting from uncompressed records to compressed records, converting from unclustered to clustered records, converting from uncompressed and unclustered records to compressed and clustered records, converting records from a row major format to a column major format, converting records from a column major format to a row major format, or any other format conversion.

At step 318, upon converting each of the records in the particular set of one or more records from the first state to the second state, process 300 stores the particular set of one or more records, which are in the second state, into the base segment 210. In an implementation, the storage optimization service 115, upon converting the particular set of one or more records into the second state, stores the particular set of one or more records in one or more of the extents 214, 216, and 218, which belong to base segment 210.

Mixed Record Optimizations

Figure 4B:
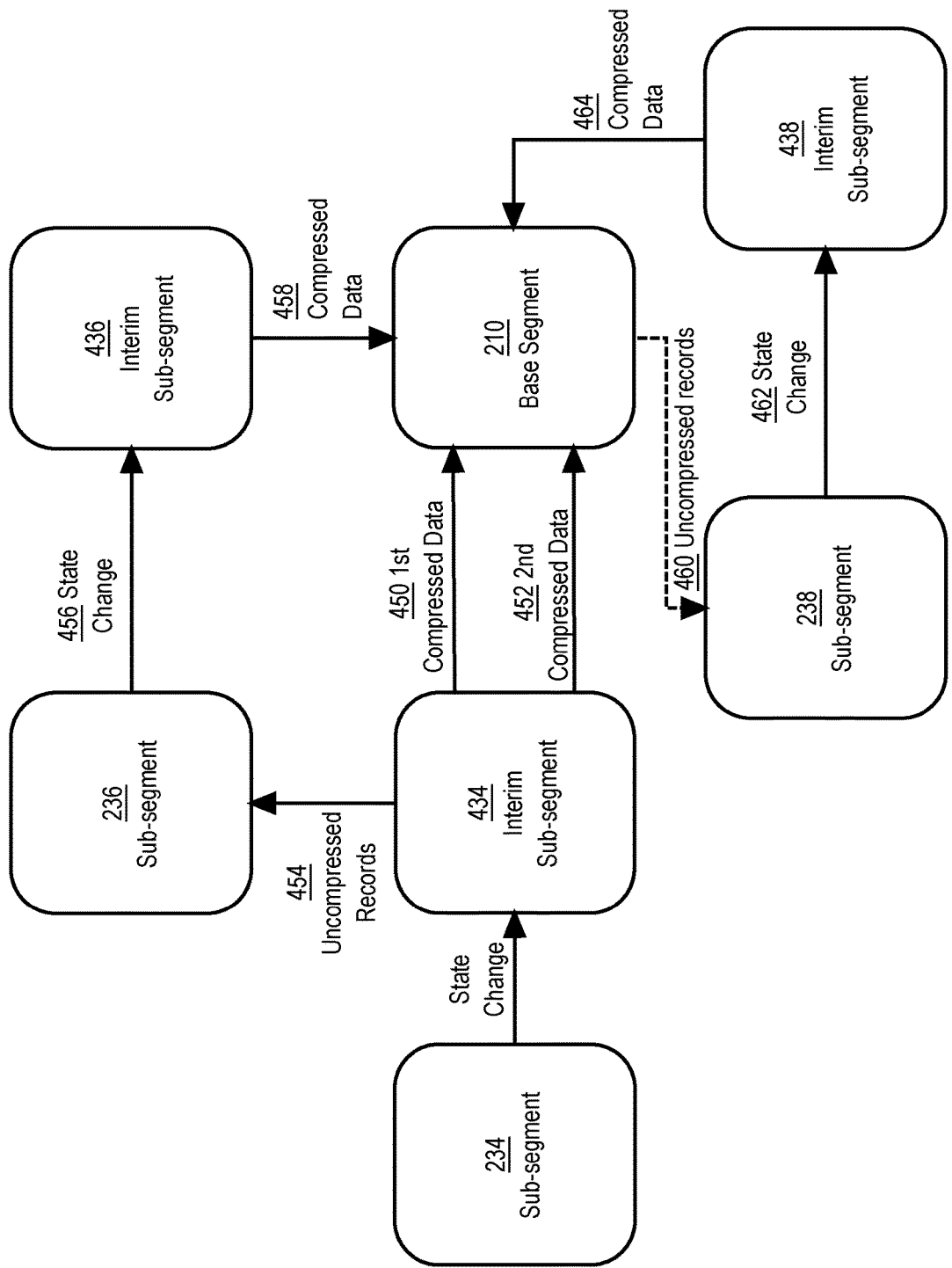
FIG. 4B depicts an example of a workload flow for storing a set of records in a segment using multiple sub-segments, according to an embodiment.

In some scenarios a subset of records in a sub-segment may remain hot while other records in the sub-segment may become cold. In an implementation, the storage optimization service 115 may implement row-level monitoring to further optimize space usage. The storage optimization service 115 may utilize multiple sub-segments to reorganize and reformat records, based on observed database characteristics, such as access frequencies of records and space pressure. FIG. 4B depicts an example of a workload flow for storing a set of records in a segment using multiple sub-segments, according to an embodiment. In FIG. 4B, sub-segment 234 represents a sub-segment that has been loaded with a set of records. Interim sub-segment 434 represents the sub-segment after the storage optimization service 115 has changed the state of sub-segment 234 from "staging" to "interim". As discussed, the storage optimization service 115 may change the state of a sub-segment from "staging" to "interim" if the storage optimization service 115 determines that a database characteristic has satisfied specific criteria that either: (1) the access frequency of at least a subset of records in sub-segment 234 is below is a first threshold, (2) the size of sub-segment 234 exceed a size threshold, (3) the storage optimization service 115 determines that no more records are to be loaded into sub-segment 234, or any other criteria defined within a policy for migrating records.

In an implementation, the storage optimization service 115 monitors database characteristics related to the set of records in interim sub-segment 434. As described previously, the storage optimization service 115 may implement multiple different access thresholds to determine different sets of records that may be optimized using different levels of compression. For example, if the storage optimization service 115 determines that the access frequency for a first subset of the set of records in interim sub-segment 434 is below the first threshold, then the storage optimization service 115 may compress the first set of records using the highest level of compression, such as HCC Archive, to generate first compressed data 450. The first compressed data 450 is then inserted into base segment 210. If the storage optimization service 115 determines that the access frequency for a second subset of the set of records in interim sub-segment 434 is below a second threshold but above the first threshold, then the storage optimization service 115 may compress the second set of records using the second highest level of compression, such as HCC Query, to generate second compressed data 452. The second compressed data 452 is then inserted into base segment 210.

In an implementation, the storage optimization service 115 may determine that the access frequency for a third subset of records in interim sub-segment 434 is above a third threshold, where exceeding the third threshold indicates that the third subset of records is "hot". The storage optimization service 115 may transfer the third subset of records to another sub-segment that contains other hot records. For example, the storage optimization service 115 may move the third subset of records from interim sub-segment 434 to sub-segment 236. The transfer of records between sub-segment 434 and sub-segment 236 is performed without compressing the records. Referring to FIG. 4B, uncompressed records 454 represents the third subset of records that are transferred from interim sub-segment 434 to sub-segment 236.

The storage optimization service 115 may monitor the hot records in sub-segment 236 to determine when the records are below an access frequency threshold or when the size of sub-segment 236 exceeds the predefined sub-segment size threshold. Referring to FIG. 4B, when the storage optimization service 115 determines that either the records are below an access frequency threshold or when the size of sub-segment 236 exceeds the predefined sub-segment size threshold, the storage optimization service 115 performs state change 456 which changes the state of sub-segment 236 to interim sub-segment 436. Once in the interim state, the storage optimization service 115 compresses records and inserts the compressed data 458 into base segment 210.

In an implementation, if the records in interim segment 436 remain "very hot", meaning that the records are accessed at such a frequency that the none of the access frequency thresholds are crossed, then the storage optimization service 115 may insert the records, in an uncompressed state, into base segment 210. An example of this situation may be that the records in interim sub-segment 436 are records that are accessed and/or modified at such a high frequency that any compression of the records would degrade performance. Therefore, the storage optimization service 115 inserts the records into base segment 210 as no compression may be optimal for storing such records.

Monitoring Base Segments

The storage optimization service 115 may also monitor database characteristics related to records stored in base segment 210. Records stored in base segment 210 may be compressed records, compressed and clustered records, clustered records, or uncompressed and unclustered records. In an example, if the access frequency of a set of records, that are compressed, exceeds a particular threshold for identifying "hot" data, then the storage optimization service 115 may move the set of compressed records to a sub-segment. Specifically, the storage optimization service 115 may decompress the set of compressed records to generate uncompressed records and insert the uncompressed records into a new sub-segment generated by the storage optimization service 115. Referring to FIG. 4B, uncompressed records 460 represents the storage optimization service 115 decompressing the set of compressed records and inserting the uncompressed records 460 into sub-segment 238. Once the uncompressed records 460 are in sub-segment 238, the storage optimization service 115 may monitor database characteristics related to records in sub-segment 238. The storage optimization service 115 may change the state of sub-segment 238 from "staging" to "interim" (state change 462) when a particular criteria related to database statistics is satisfied, such as when the access frequencies of records are below an access frequency threshold. The interim state is represented by interim sub-segment 438. Compressed data 464 represents when the storage optimization service 115 compresses records from interim sub-segment 438 and inserts the compressed data 464 back into base segment 210. In another example, the storage optimization service 115 may insert compressed data 464 into a new or different base segment, other than base segment 210. If records are moved to another base segment and base segment 210 becomes empty, then the storage optimization service 115 may delete base segment 210 to reclaim storage space.

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically-marked data objects; however, the hierarchically-marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™

Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e. .java file) and the compiled version of the class (i.e. .class file).

Native data types are data types supported by a DBMS "out-of-the-box". Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as a valid data types and to be processed by a DBMS in database statements. In general, database software of a DBMS is programmed to recognize and process native data types without configuring the DBMS to do so by, for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
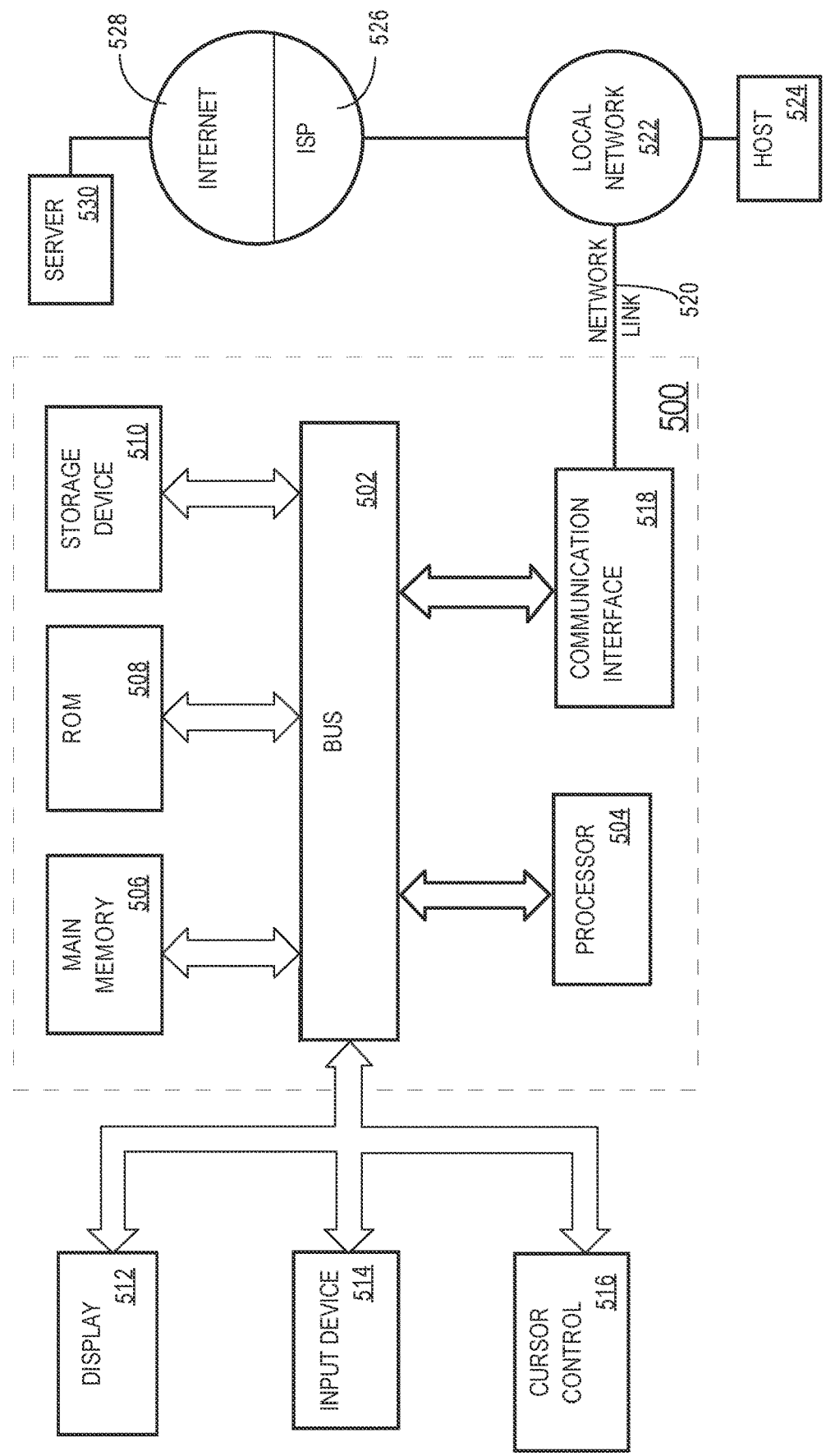
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
maintaining, within a database system, a base segment that is a container for storing records that belong to a database object;
receiving a request to load, into the database object, a first set of records that are in a first state;
generating a sub-segment that is a container that is separate from the base segment;
inserting, into the base segment, a reference to the sub-segment;
storing, within the sub-segment, the first set of records in the first state;
after storing the first set of records in the sub-segment, monitoring, by the database system, one or more characteristics of records that belong to the first set of records;
determining, by the database system, that the one or more characteristics of each record, of a particular set of one or more records from the first set of records, satisfies particular criteria;
in response to determining that the one or more characteristics of each record, of the particular set of one or more records from the first set of records, satisfies the particular criteria, performing a migration of the particular set of one or more records from the sub-segment to the base segment;
during the migration:
converting each record, of the particular set of one or more records, from the first state to a second state;
storing, in a target segment, each record, of the particular set of one or more records, in the second state;
wherein the target segment is the base segment or another sub-segment.

2. The computer-implemented method of claim 1, wherein the target segment is the base segment.

3. The computer-implemented method of claim 2, wherein converting each record, of the particular set of one or more records, from the first state to the second state comprises converting each record of the particular set of one or more records from an uncompressed format to a compressed format.

4. The computer-implemented method of claim 2, wherein converting each record, of the particular set of one or more records, from the first state to the second state comprises at least one of:
converting each record of the particular set of one or more records from an unclustered format to a clustered format,
converting each record of the particular set of one or more records from a row major format to a column major format, or converting each record of the particular set of one or more records from the column major format to the row major format.

5. The computer-implemented method of claim 2, wherein monitoring the one or more characteristics of the records that belong to the first set of records comprises monitoring access frequency of the records that belong to the first set of records stored within the sub-segment.

6. The computer-implemented method of claim 2, wherein monitoring the one or more characteristics of the records that belong to the first set of records comprises monitoring a rate of change requests to change values in records that belong to the first set of records.

7. The computer-implemented method of claim 2, wherein monitoring the one or more characteristics of the records that belong to the first set of records further comprises, monitoring overall size of the sub-segment that contains the first set of records.

8. The computer-implemented method of claim 2, wherein monitoring the one or more characteristics of the records that belong to the first set of records further comprises, monitoring overall space allocated in persistent storage that is associated with the database system.

9. The computer-implemented method of claim 2, further comprising:
   determining, by the database system, that the one or more characteristics of each record, of a second particular set of one or more records from the first set of records, satisfies second particular criteria;
   in response to determining that the one or more characteristics of each record, of the second particular set of one or more records from the first set of records, satisfies the second particular criteria, performing a migration of the second particular set of one or more records from the sub-segment to a second sub-segment;
   wherein the second particular set of one or more records are separate and distinct from the particular set of one or more records;
   wherein the second sub-segment is a container that is separate from the sub-segment and the base segment;
   during the migration:
      converting each record, of the second particular set of one or more records from the first state to a third state, wherein the third state is different from the second state;
      storing, in the second sub-segment, each record, of the second particular set of one or more records, in the third state.

10. The computer-implemented method of claim 9, further comprising:
   receiving a request to retrieve the particular set of one or more records and the second particular set of one or more records;
   using an extent map to determine storage locations of the particular set of one or more records and the second particular set of one or more records, wherein the extent map contains physical address locations for records stored in the base segment, the sub-segment, and the second sub-segment;
   generating a result set that contains the particular set of one or more records retrieved from the base segment, and the second particular set of one or more records retrieved from the second sub-segment.

11. The computer-implemented method of claim 2, further comprising:
   upon storing the particular set of one or more records in the second state into the base segment, monitoring the one or more characteristics of records that belong to the particular set of one or more records;
   determining, by the database system, that the one or more characteristics of each record, of a third particular set of one or more records from the particular set of one or more records, satisfies third particular criteria;
   in response to determining that the one or more characteristics of each record, of the third particular set of one or more records, satisfies the third particular criteria, performing a migration of the third particular set of one or more records of one or more records from the base segment to a second sub-segment;
   during the migration:
      converting, each record, of the third particular set of one or more records from the second state to a third state;
      storing, in the second sub-segment, each record, of the third particular set of one or more records, in the third state.

12. A computer-implemented method comprising:
   maintaining, within a database system, a base segment that is a container for storing records that belong to a database object, wherein the base segment contains a set of records that are in a first state;
   monitoring, by the database system, one or more characteristics of records that belong to the set of records;
   determining, by the database system, that the one or more characteristics of each record, of a particular set of one or more records from the set of records, satisfies particular criteria;
   in response to determining that the one or more characteristics of each record, of the particular set of one or more records from the set of records, satisfies the particular criteria,
      generating a sub-segment that is a container that is separate from the base segment; and
      inserting, into the base segment, a reference to the sub-segment;
   upon generating the sub-segment, performing a migration of the particular set of one or more records from the base segment to the sub-segment;
   during the migration:
      converting each record, of the particular set of one or more records, from the first state to a second state;
      storing, in the sub-segment, each record, of the particular set of one or more records, in the second state;
   wherein converting each record, of the particular set of one or more records, from the first state to the second state comprises at least one of:
      converting each record of the particular set of one or more records from a compressed format to an uncompressed format,
      converting each record of the particular set of one or more records from a clustered format to an unclustered format,
      converting each record of the particular set of one or more records from a row major format to a column major format, or
      converting each record of the particular set of one or more records from a column major format to a row major format.

13. The computer-implemented method of claim 12, wherein monitoring the one or more characteristics of the records that belong to the set of records comprises monitoring access frequency of the records that belong to the set of records stored within the sub-segment.

14. The computer-implemented method of claim 12, further comprising:
- upon storing, each record, of the particular set of one or more records, in the second state, monitoring the one or more characteristics of records that belong to the particular set of one or more records;
- determining, by the database system, that the one or more characteristics of each record, of the particular set of one or more records from the set of records, satisfies particular criteria;
- in response to determining that the one or more characteristics of each record, of the particular set of one or more records, satisfies the particular criteria, performing a migration of the particular set of one or more records from the sub-segment back to the base segment;
- during the migration:
  - converting each record, of the particular set of one or more records, from the second state to a third state;
  - storing, in the base segment, each record, of the particular set of one or more records, in the third state.

15. A non-transitory computer-readable storage medium storing sequences of instructions that, when executed by one or more processors, cause:
- maintaining, within a database system, a base segment that is a container for storing records that belong to a database object;
- receiving a request to load, into the database object, a first set of records that are in a first state;
- generating a sub-segment that is a container that is separate from the base segment;
- inserting, into the base segment, a reference to the sub-segment;
- storing, within the sub-segment, the first set of records in the first state;
- after storing the first set of records in the sub-segment, monitoring, by the database system, one or more characteristics of records that belong to the first set of records;
- determining, by the database system, that the one or more characteristics of each record, of a particular set of one or more records from the first set of records, satisfies particular criteria;
- in response to determining that the one or more characteristics of each record, of the particular set of one or more records from the first set of records, satisfies the particular criteria, performing a migration of the particular set of one or more records from the sub-segment to the base segment;
- during the migration:
  - converting each record, of the particular set of one or more records, from the first state to a second state;
  - storing, in a target segment, each record, of the particular set of one or more records, in the second state;
  - wherein the target segment is the base segment or another sub-segment.

16. The non-transitory computer-readable storage medium of claim 15, wherein the target segment is the base segment.

17. The non-transitory computer-readable storage medium of claim 16, wherein converting each record, of the particular set of one or more records, from the first state to the second state comprises converting each record of the particular set of one or more records from an uncompressed format to a compressed format.

18. The non-transitory computer-readable storage medium of claim 16, wherein converting each record, of the particular set of one or more records, from the first state to the second state comprises at least one of:
- converting each record of the particular set of one or more records from an unclustered format to a clustered format,
- converting each record of the particular set of one or more records from a row major format to a column major format, or
- converting each record of the particular set of one or more records from the column major format to the row major format.

19. The non-transitory computer-readable storage medium of claim 16, wherein monitoring the one or more characteristics of the records that belong to the first set of records comprises monitoring access frequency of the records that belong to the first set of records stored within the sub-segment.

20. The non-transitory computer-readable storage medium of claim 16, wherein monitoring the one or more characteristics of the records that belong to the first set of records comprises monitoring a rate of change requests to change values in records that belong to the first set of records.

* * * * *